EDWIN DAY.

Improvement in Door-Knobs, &c.

No. 4,878. Reissued April 23, 1872.

Witnesses:
Chas. E. Barnes
Charles Stodder

Inventor:
Edwin Day
By T. S. King
his Atty

AM. PHOTO-LITHOGRAPHIC CO. N.Y. (OSBORNE'S PROCESS)

UNITED STATES PATENT OFFICE.

EDWIN DAY, OF ROCKFORD, ILLINOIS.

IMPROVEMENT IN DOOR-KNOBS, &c.

Specification forming part of Letters Patent No. 85,799, dated January 12, 1869; reissue No, 4,878, dated April 23, 1872.

*To all whom it may concern:*

Be it known that I, EDWIN DAY, late of Chicago, but now of Rockford, Winnebago county, and State of Illinois, have invented certain new and useful Improvements in Knobs for Doors, Drawers, Curtains, &c.; and I do hereby declare that the following is a full, clear, and exact description thereof, reference being had to the accompanying drawing making part of this specification, and to the letters of reference marked thereon, like letters indicating like parts wherever they occur.

To enable others skilled in the art to construct and use my invention, I will proceed to describe it.

Figure 1:
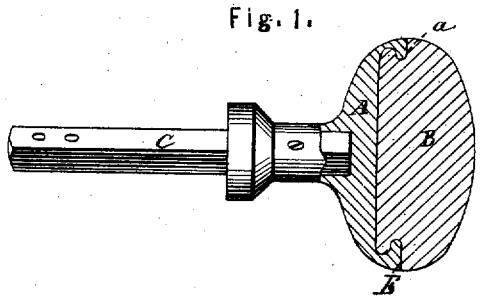
Figure 2:
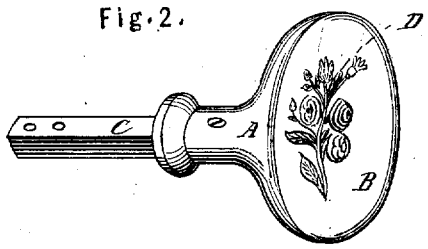
Figure 3:
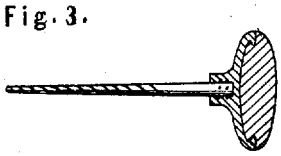

Figure 1 is a partial section of my door-knob with the spindle attached. Fig. 2 is a perspective view of the same; and Fig. 3 is a knob from which to suspend pictures, &c.

My improvement consists in making a knob for attachment to doors, drawers, &c., in which the knob proper is constructed in a novel form, with a shoulder resting against the metal shank, a groove, by which the glass head is joined to the shank, and a plain or flat back, which is hereinafter more fully described.

In making door-knobs, especially when made of glass, it has been difficult to secure them, so as to prevent them from becoming loose on the shank. Heretofore they have been secured to the shank by plaster-of-Paris, screws, pins, &c.; and when attached by cement the sun striking upon it would soften the cement, and allow the knob or head to pull off.

In constructing my knob, I provide a glass head, B, of the ordinary form on its front face, but having a projecting portion on the back of less diameter than the main body of the knob. This projection has formed around its periphery a groove, *a*, as shown in Fig. 1. The object of this projection and flange formed by the groove *a* is to furnish the means of securely connecting the shank A with the glass head B. The glass B is placed in a mold of the form of the knob and shank when finished, and soft metal or alloy cast upon its back, as in Fig. 1, said metal extending over the projecting portion on the back of the head, filling the groove, and coming out flush with the body of the glass and against the shoulder E, furnishing a metallic brace or support for the glass head B. A portion of this metal extends out from the back of the knob and forms the shank A, said shank being provided with a square hole to receive the spindle C.

By thus casting the metal over and around the projecting portion of the head or knob, it will be held firmly in place, especially as the metal contracts in cooling.

To prevent the cracking of the glass by contact with the hot metal, it should be slightly warmed previously to pouring on the metal.

For the purpose of ornamenting the knob I place on the back side of the glass any suitable design, picture, colors, the name or photograph of the owner, or the number of the room or house, and then cast the metal over it, thus securing it in place, and preventing the possibility of its being injured while the knob remains whole. The said designs may be made in any suitable manner, or of suitable materials, as of paper or sheet metal; or they may be recessed in the glass itself, and filled with material of any kind. Where paper or a similar article is used, it may be necessary to protect it from the hot metal by placing some non-conductor of heat back of it, as, for instance, plaster-of-Paris.

My method of attaching glass heads is not confined to door-knobs, but is applicable to drawer-knobs, curtain-hooks, picture-nails, &c., as in Fig. 3.

It is obvious that porcelain, wood, china, or other heads may be attached in the same manner as the glass ones, and that any suitable metal may be used, as tin, pewter, lead, brass, or any alloy of metals, the object being to have a metal which shall be hard enough to give a fine finish, but fuse at a low temperature.

When it is desired to give a very high finish to the knobs, the metal portion is silver-plated, but for ordinary use this is not necessary, as they leave the mold very smooth and white.

I do not claim a glass head or knob having an extended glass shank connected with a metal socket at the end of the glass shank, and which leaves the glass shank between the metal socket and the head or knob proper without metallic support. This I know to be old.

Having thus described my invention, what I claim is—

A glass head for a door-knob, constructed in the peculiar form shown and described—that is to say, with the shoulder E, groove *a*, and a plain back, instead of an extended glass shank—and joined to a metallic shank, substantially as described.

EDWIN DAY.

Witnesses:
JAS. CROSBY,
JNO. B. ARCHER,
L. S. DAY,
P. H. MANNEL.